United States Patent
Sudau

[11] Patent Number: 6,155,946
[45] Date of Patent: Dec. 5, 2000

[54] HYDRODYNAMIC CLUTCH DEVICE WITH A TRANSMISSION

[75] Inventor: Jörg Sudau, Niederwerrn, Germany

[73] Assignee: Mannesmann Sachs AG, Schweinfurt, Germany

[21] Appl. No.: 09/311,454

[22] Filed: May 13, 1999

[30] Foreign Application Priority Data

May 14, 1998 [DE] Germany ............................ 198 21 644

[51] Int. Cl.[7] ................................................. F16H 45/00
[52] U.S. Cl. ................................ 475/53; 475/55; 475/44; 74/732.1
[58] Field of Search .................... 475/44–59; 74/732.1

[56] References Cited

U.S. PATENT DOCUMENTS

| | | | |
|---|---|---|---|
| 3,665,707 | 5/1972 | Koivunen | 475/136 X |
| 4,237,748 | 12/1980 | Brimmer et al. | 74/732.1 |
| 4,651,521 | 3/1987 | Ossi | 60/226.3 |
| 5,466,195 | 11/1995 | Nogle et al. | 475/55 |

FOREIGN PATENT DOCUMENTS

| | | | |
|---|---|---|---|
| 32 22 119 C1 | 10/1983 | Germany. | |
| 41 21 586 A1 | 1/1993 | Germany. | |
| 44 23 640 A1 | 6/1995 | Germany | F16H 45/02 |
| 195 29 739 A1 | 2/1997 | Germany. | |

*Primary Examiner*—Khoi Q. Ta
*Attorney, Agent, or Firm*—Cohen, Pontani, Lieberman & Pavane

[57] ABSTRACT

A hydrodynamic clutch device is constructed with a clutch housing which is in a working connection with at least one drive. The hydrodynamic, clutch device has a hydrodynamic circuit formed at least by an impeller wheel and turbine wheel. The speed of the impeller wheel is adjustable corresponding to the speed of the housing, and the drive is connected with the impeller wheel via a transmission for carrying out a change in the speed.

7 Claims, 8 Drawing Sheets

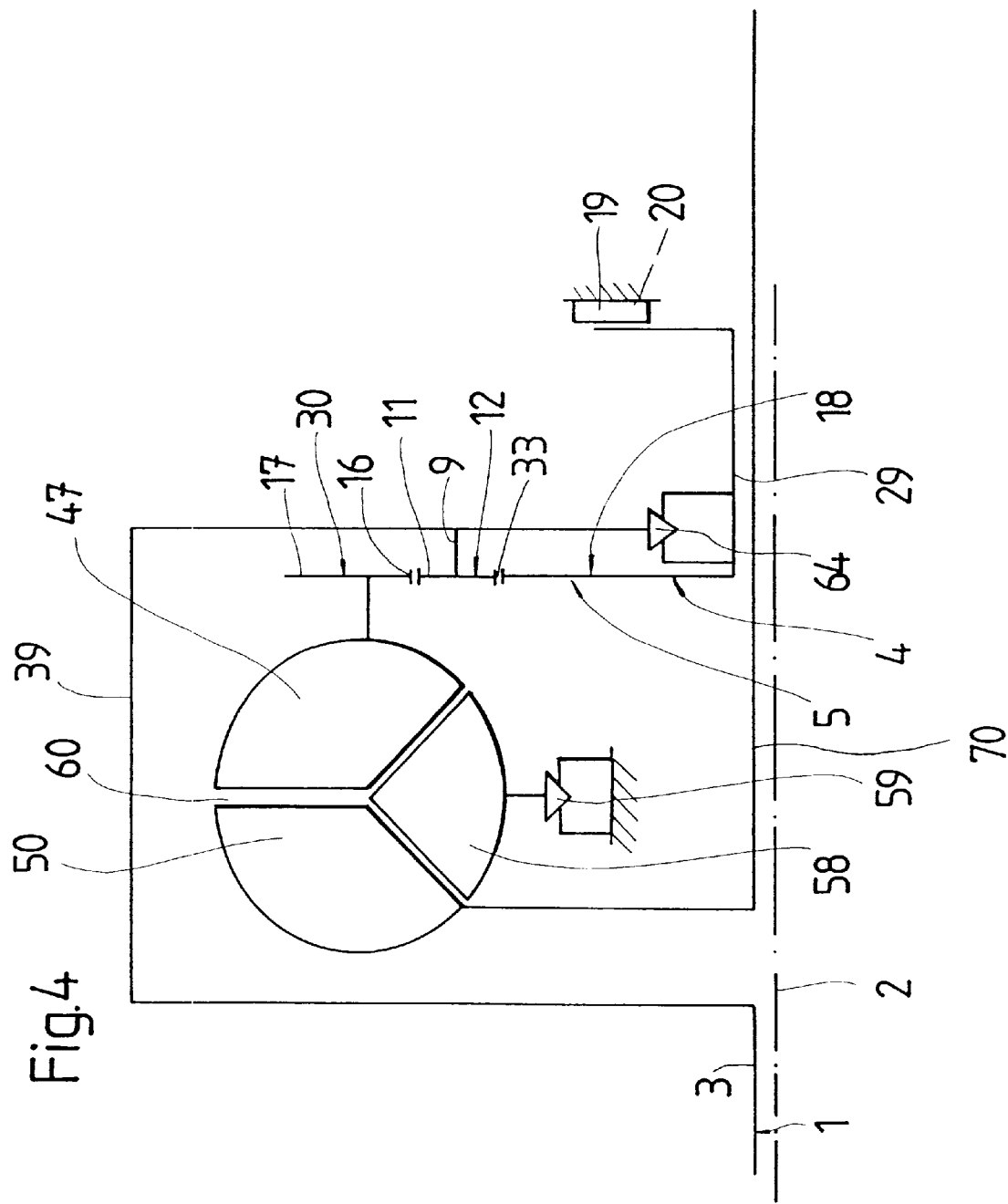

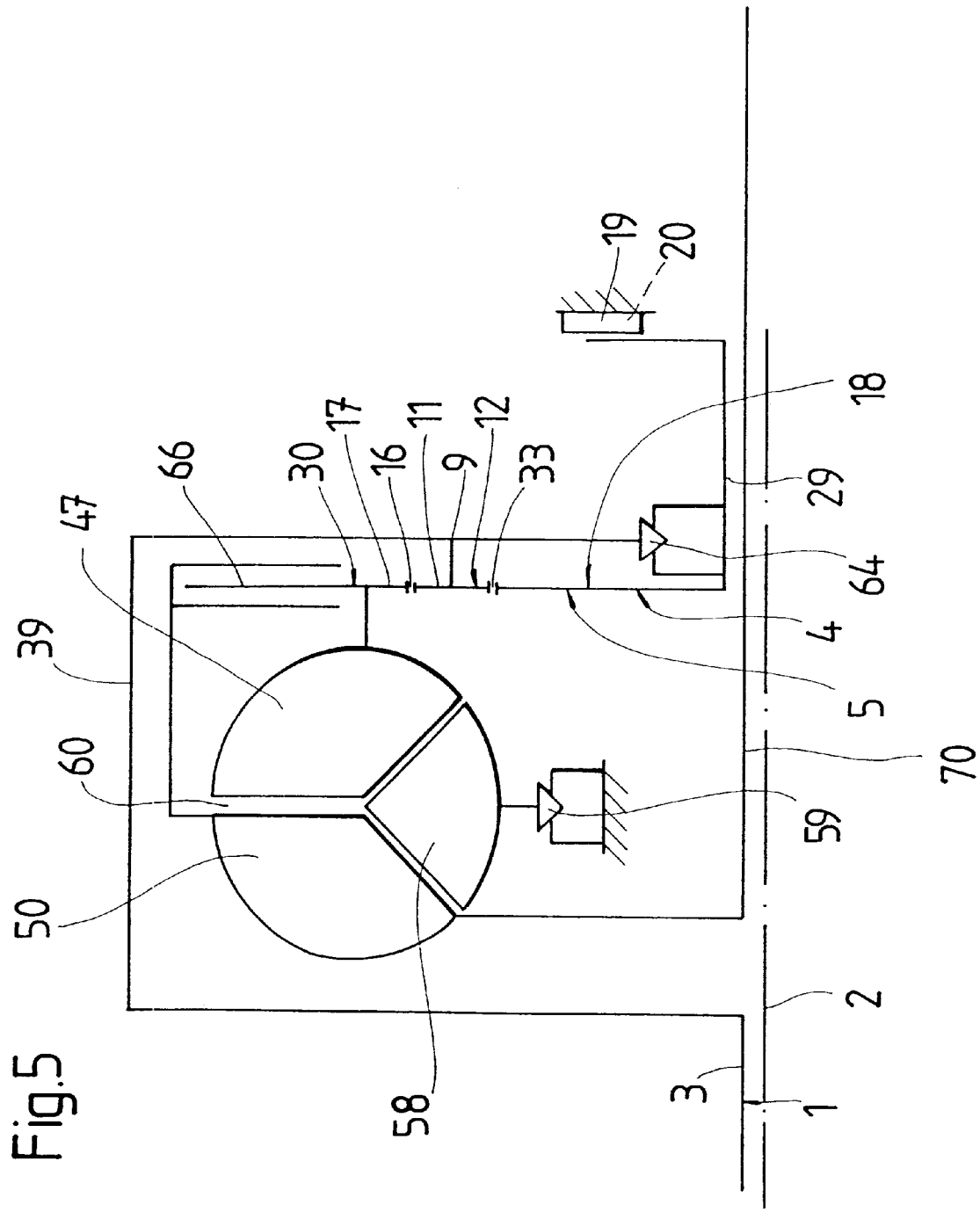

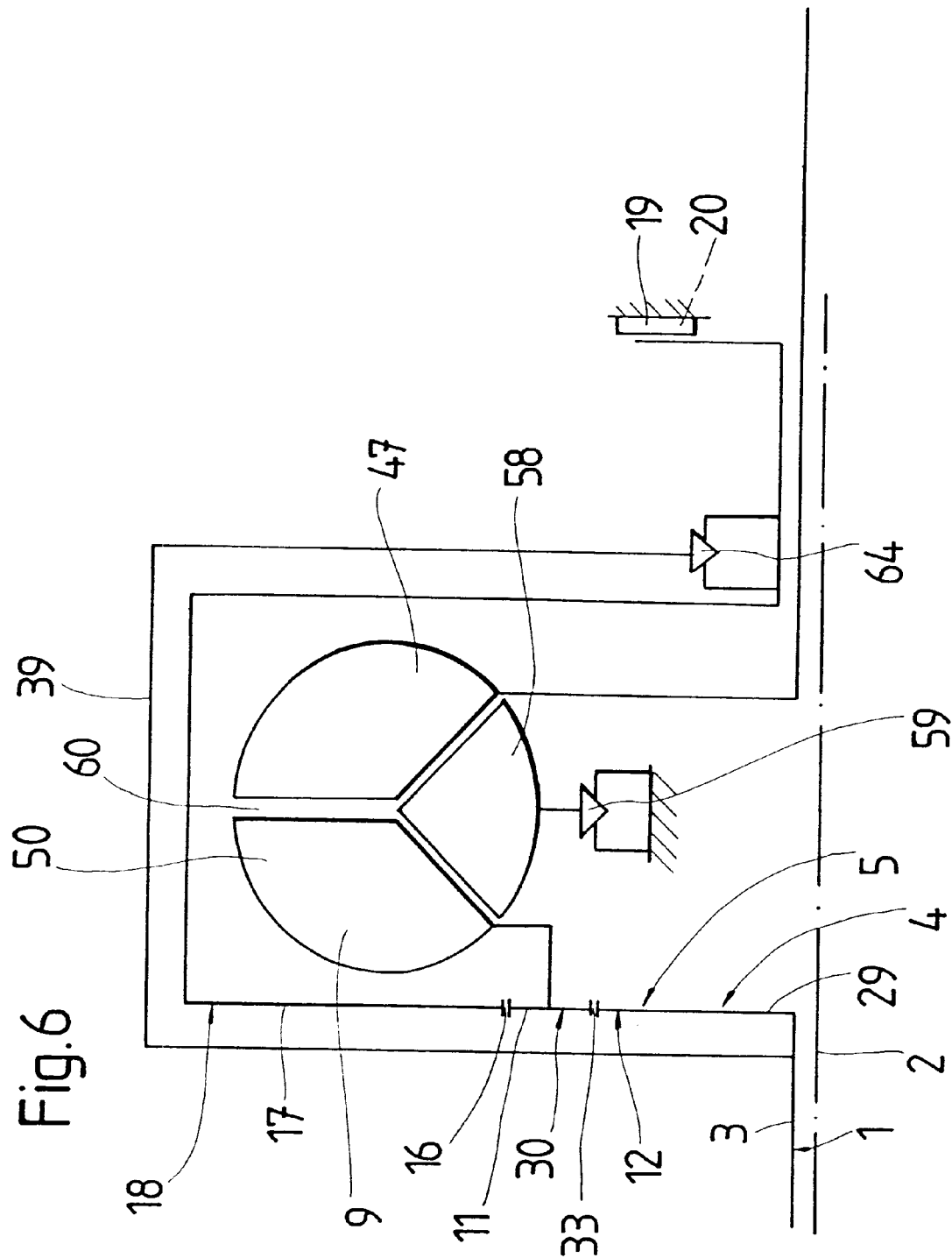

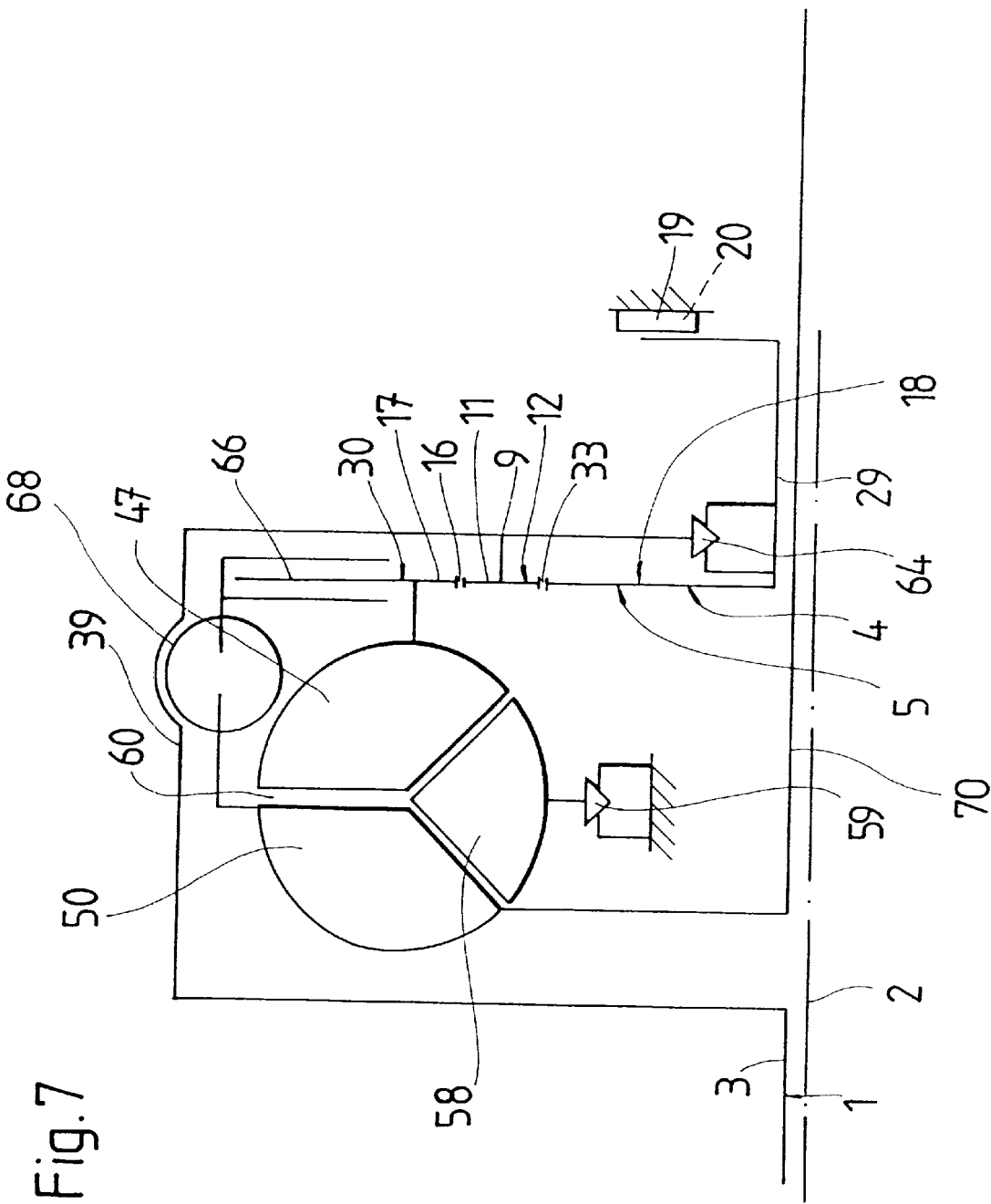

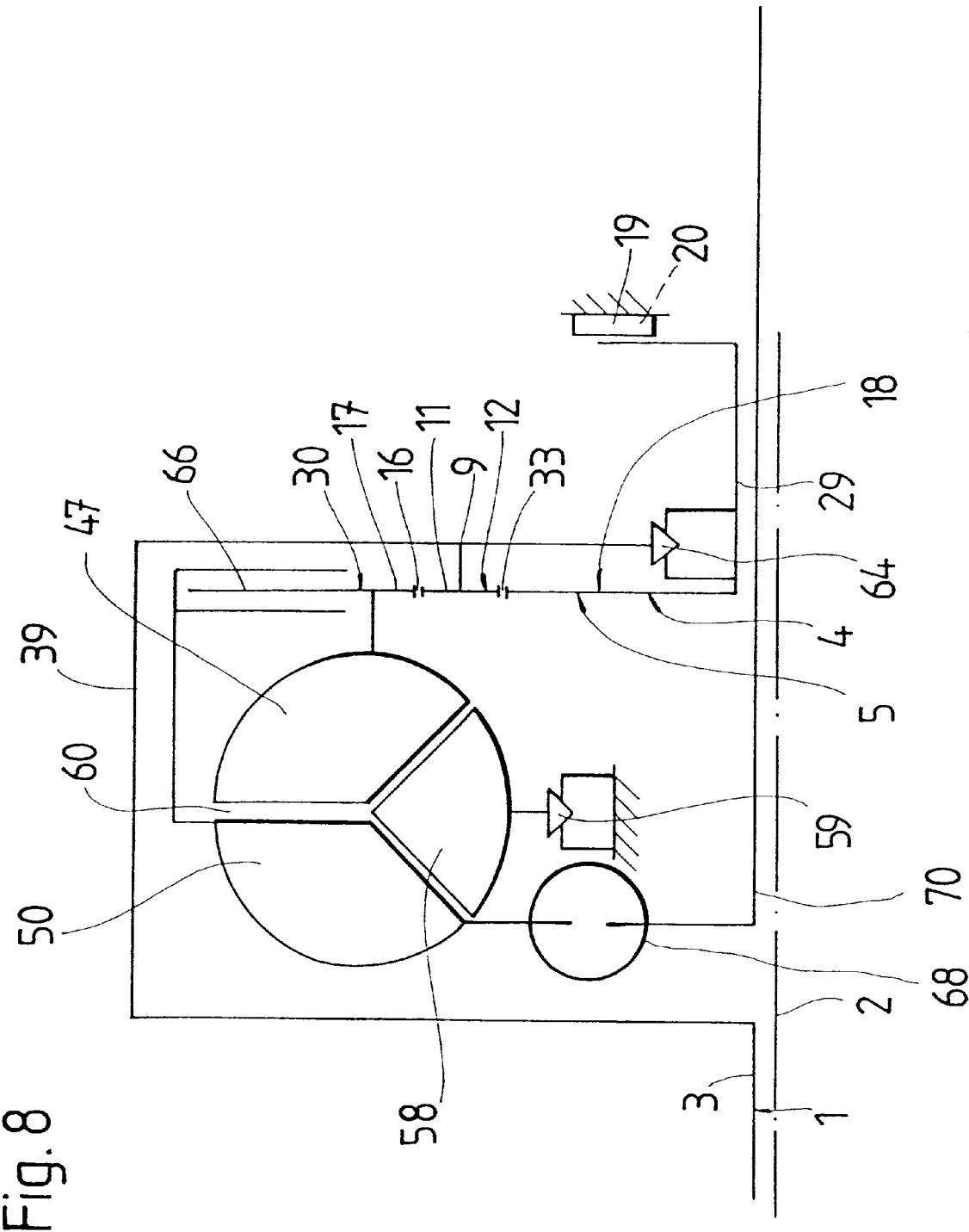

HYDRODYNAMIC CLUTCH DEVICE WITH A TRANSMISSION

BACKGROUND OF THE INVENTION

1. Field of the Invention

The present invention relates to hydrodynamic clutch devices and more particularly to a hydrodynamic clutch device having a transmission.

2. Description of the Related Art

DE 44 23 640 A1 describes, particularly in FIG. 1, a hydrodynamic clutch device in the form of a torque converter having a clutch housing which can be brought into working connection with a drive, for example, the crankshaft of an internal combustion engine. The torque converter has an impeller wheel, a turbine wheel and stator wheel axially arranged between the impeller wheel and the turbine wheel thereby forming a hydrodynamic circuit, wherein the stator wheel is arranged on a stator freewheel.

The above-mentioned working connection between the drive and a clutch housing can be seen, for example, from DE 32 22 119 C1, FIG. 1. In this case, where the crankshaft serves as a drive, the clutch housing is screwed thereto via a plate. Consequently, because of the fixed connection with respect to rotation, the rate of rotation of the clutch housing corresponds to the rate of rotation of the crankshaft. When the clutch housing is also constructed in one piece with the impeller shell of the impeller wheel, as is the case in DE 44 23 640 A1, the impeller wheel also adopts the rate of rotation of the crankshaft accordingly.

The acceptance torque of a clutch device of the type mentioned above must be adapted to the torque characteristic of the drive. In this connection, the clutch device must be designed such that its characteristic is flexible or smooth enough that it does not cause the drive to stall during cold starting of diesel engines which are especially critical in this respect. The drawback in adapting the clutch device in this way is a comparatively poor efficiency because, due to the unchangeability of the characteristic of the clutch device, it must also be maintained when the drive is at warm operating temperature.

Different constructions have been suggested to solve this problem. For example, DE 195 29 739 A1 suggests a second turbine wheel which can be switched on via a clutch so that a second characteristic can be realized. However, a construction of this kind is very complicated and expensive.

SUMMARY OF THE INVENTION

It is an object of the invention to construct a hydrodynamic clutch device such that its acceptance torque can be adapted to the torque characteristic of a drive in a simple manner on the one hand, and a relatively high torque can be transmitted on the other hand.

This and other objects are achieved in accordance with an embodiment of the invention through the connection of the drive with the impeller wheel via a transmission which effects a change in speed. The speed of the impeller wheel relative to the crankshaft can thereby be changed, wherein, depending on the construction of the transmission, both a speed increase and speed reduction of the impeller wheel is possible. In the first instance, the amount of impeller torque can be increased considerably because, at a given impeller wheel diameter, the impeller torque increases quadratically with the angular velocity. However, if the impeller torque available thus far has been sufficient, the impeller wheel diameter can be reduced by the speed increase mentioned above. Thus, the same performance or efficiency of the clutch device can be achieved with a clutch housing having a substantially smaller diameter. Furthermore, because of the higher speed of the clutch device, the coupling responses are faster.

Of course, the pressure load in the hydrodynamic circuit increases at higher angular velocities, so that insofar as the transmission acts between the drive and converter housing, the converter housing is exposed to a higher pressure load. In order to avoid constructing the clutch housing so as to be more stable with respect to pressure, it is also possible to arrange the transmission between the clutch housing and the impeller wheel so that it is only necessary to construct the impeller wheel in a more stable manner.

During the speed reduction, the impeller torque drops due to the decreasing angular velocity, this is very important, specifically in diesel engines which deliver a low driving torque in the warm running phase. When the transmission is constructed with a shifting device, the transmission can be shifted such that when the drive is at a warm operating temperature, a second operating characteristic is associated with the clutch device.

An advantageous embodiment for a transmission of this kind consists of a planetary gearset in which it is easily possible for the drive, which acts on one of the transmission elements to be accompanied by an additional drive which is in a working connection with another of the transmission elements. Thus, a different rate of rotation or speed can be adjusted at another transmission element from the difference in speed between the two driven transmission elements. This other transmission element is preferably the driven-side transmission element which communicates with the clutch housing or with the impeller wheel. When the additional drive is constructed as an electric or hydraulic motor, it is brought up to speed in order to carry out a regulating process at the element of the planetary gearset acting as an intermediate transmission element or, when it is already in operation, to carry out a change in speed. The above-mentioned speed difference between two transmission elements can also be produced by using a brake instead of the additional drive. This brake can be constructed, for example, as a mechanical disk brake or as a hydraulic damper, wherein the speed of the intermediate transmission element is reduced by the brake in order to exert a regulating influence on the speed of the driven-side transmission element. While the brake constructions mentioned by way of example cancel energy, the use of a generator as a brake makes it possible to convert the brake energy into electrical energy and feed it to a battery.

A further possibility consists in that the additional drive or the brake engages the planetary gearset via the intermediate transmission element in a sharply regulating manner such that the driven-side transmission element essentially comes to a standstill. This is advantageous, particularly when the vehicle is stationary and the drive is running, because it prevents unwanted driving of the impeller wheel which ultimately results in power loss due to unwanted transmission drag torque. This step eliminates so-called creeping of the vehicle.

When the additional drive is constructed substantially by means of an electric or hydraulic motor, it can be operated such that it can be switched on during acceleration phases of the drive so as to assist the drive, thereby improving the efficiency of the motor vehicle.

It is possible however, to supplement the additional drive or the brake by means of an additional brake through which the clutch housing can be connected with the intermediate transmission element. Depending on the switching state of this additional brake, especially when the clutch housing acts as planetary carrier for the planetary gear, the sun gear acts as the intermediate transmission element and the ring gear acts as driven-side transmission element, the following switching states are possible, wherein these switching states are described, by way of example, with reference to a construction having a brake at the intermediate transmission element:

Provided that both the brake and the additional brake are open, only a negligibly low transmission drag torque is transmitted while the drive is running. That is, the impeller speed can be reduced when the vehicle is stopped until there is hardly any hydrodynamic loss or flow loss between the impeller wheel and the turbine wheel.

If the brake for the intermediate transmission remains open but the additional brake is closed, the clutch housing revolves at the same rate of rotation as the drive. This corresponds, for example, to a first gear in which the turbine wheel and accordingly the transmission input shaft are driven at a first speed. On the other hand, if the brake of the intermediate transmission element is closed and the additional brake is open, the converter housing runs at a speed that is changed relative to the drive by the transmission. This corresponds to the switching on of a second switching step and accordingly to a second speed at the transmission input shaft. A transmission connected with the clutch device can be operated accordingly such that the available gears can be doubled. When both the brake and the additional brake are closed, a braking torque can take effect at the drive.

In a simplified embodiment, the additional brake can be replaced with a freewheel so that the circuitry which would otherwise be required for the additional brake can be dispensed with. The freewheel is designed such that, for example, it locks as soon as the speed of the intermediate transmission element is greater than that of the clutch housing, which is the case when the brake for the intermediate transmission element is open. The freewheel prevents a movement of the transmission elements relative to one another so as to achieve an effect comparable to the engagement of a first switching step. After closing the brake of the intermediate transmission element, however, this acts like the activation of a second switching, step.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the views:

FIG. 4 is a schematic view corresponding to FIG. 2, showing a freewheel between the clutch housing and the sun gear according to an embodiment of the invention;

FIG. 5 is schematic view corresponding to FIG. 4 showing in addition, a clutch between a ring gear of the planetary gearset and the turbine wheel;

FIG. 6 is a schematic view of a clutch device with a freewheel between the clutch housing and a ring gear and with a brake for the ring gear according to an embodiment of the invention;

FIG. 7 is a schematic view corresponding FIG. 5 showing a torsional vibration damper between the clutch and the turbine wheel; and FIG. 8 is a schematic view corresponding to FIG. 7 showing the torsional vibration damper between the turbine wheel and a driven shaft.

DETAILED DESCRIPTION OF THE PRESENTLY PREFERRED EMBODIMENTS

Figure 1:
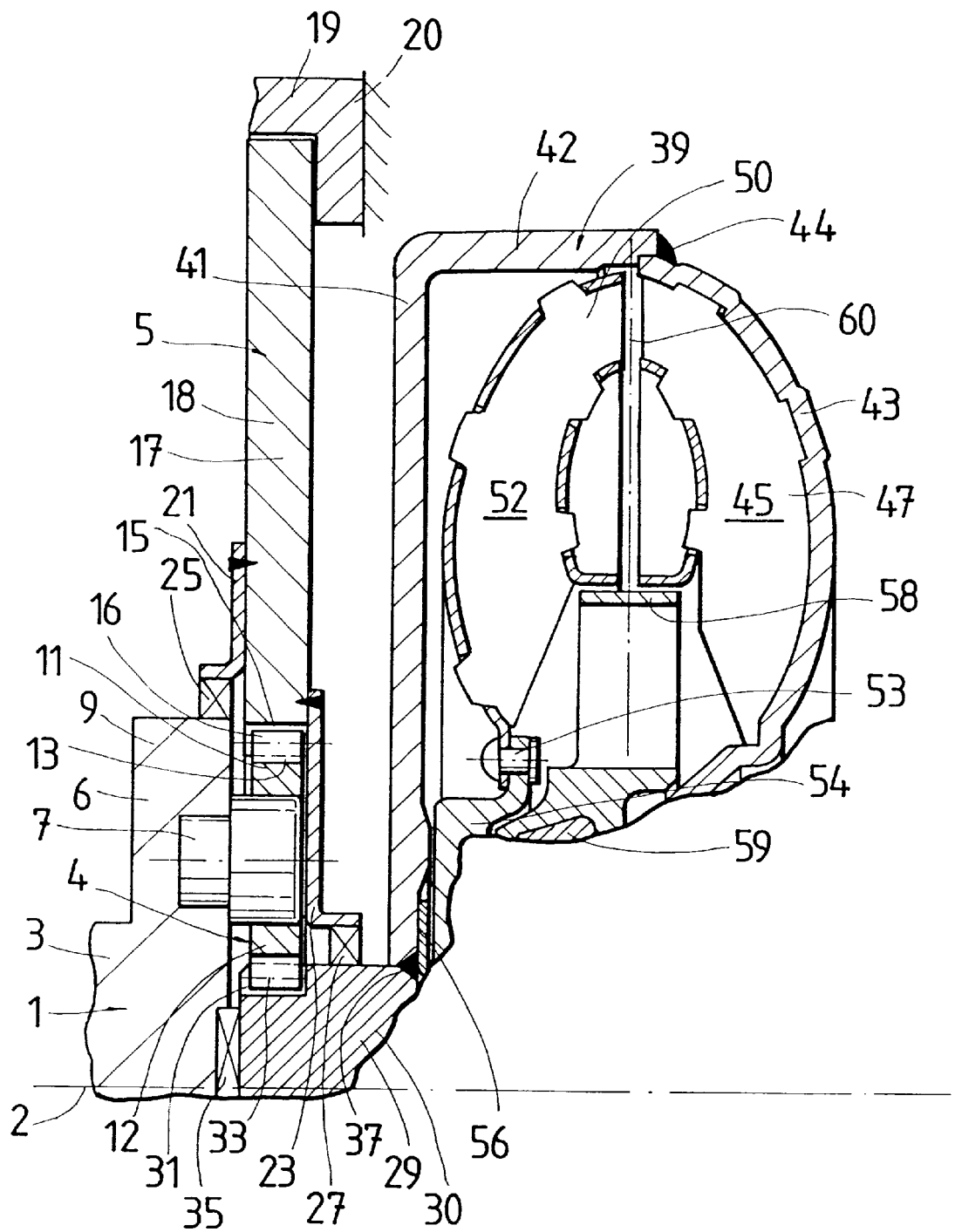
FIG. 1 is a sectional view of a hydrodynamic clutch device with a clutch housing fastened to a drive via a planetary gearset with an impeller wheel and a turbine wheel according to an embodiment of the invention.

FIG. 1 shows a clutch device formed by a hydrodynamic torque converter which is connected to a drive 1 in the form of the crankshaft 3 of an internal combustion engine. The clutch device, like the crankshaft 3, is rotatable about an axis of rotation 2. The torque converter is connected, via a gear unit 4, with the crankshaft 3, namely, in this special case of construction, via a planetary gearset 5 which, as will be explained more fully in the following, has planetary gears 11, a ring gear 17 radially arranged outside of the planetary gears 11 and a sun gear 29 which is provided radially inside of the planetary gears 11. The planetary gears 11 have teeth 13, each of which forms a tooth engagement 16 with a toothing 15 of the ring gear 17 and a tooth engagement 33 with a toothing 31 of the sun gear 29. The planetary wheels 11 are arranged so as to be rotatable in each instance via a bearing neck 7 in a flange 6 of the crankshaft 3, so that the crankshaft 3 acts as a planetary carrier 9. The ring gear 17 is radially supported by a holder 21 which is L-shaped in cross section and by a bearing 25 at the flange 6 of the crankshaft 3, and holds the sun gear 29 in its radial position by means of a bearing 27 and an additional holder 23 which is L-shaped in cross section. The sun gear 29 is in turn fixedly connected by a weld 37 with a primary flange 41 of the clutch housing 39 of the torque converter.

Regarding the flow of movement in planetary gearset 5, the movement of the crankshaft 3 is conducted over the bearing neck 7 to the planetary gears 11 which accordingly act as drive-side transmission elements 12. The ring gear 17 communicates with an additional drive 19, for example, an electric motor or hydraulic motor, so that the ring gear 17 can likewise be driven. Accordingly, the ring gear 17 acts as an intermediate transmission element 18. Due to its fixed connection with the clutch housing 39 via the weld 37, the speed of the sun gear 29, which acts as a driven-side transmission element 30, is determined in accordance with the relative speed of the planetary gears 11 and ring gear 17.

The relative speed between the planetary gears 11 and the ring gear 17 can also be controlled by means of a brake 20 acting on the ring gear. This brake is referenced in FIG. 1 by dashed lines in order to show the function as an alternative solution to the additional drive 19. This brake can be constructed, for example, as a disk brake or as a hydraulic damper, and builds up a resistance by which the speed of the ring gear 17 is braked.

Before a thorough discussion of the manner of functioning of this planetary gearset 5, the construction of the clutch device will be discussed briefly. The primary flange 41 has, in the circumferential area, an axial shoulder 42 which is fixedly connected via a weld 44 with an impeller shell 43 which has a vane arrangement 45 for forming the impeller wheel 47. Associated with the impeller wheel 47 is a turbine wheel 50 with a vane arrangement 52 which is connected by riveting 53 with a turbine hub 54 which is connected with a driven shaft so as to be fixed with respect to rotation relative to it via a toothing in a manner that is known, per se, from the above-cited DE 44 23 640 A1 and which is therefore not shown. This driven shaft is usually formed by the transmission input shaft.

A stator wheel 58 is axially arranged between the impeller wheel 47 and the turbine wheel 50 in a manner known per se via a stator freewheel 59 which, together with the impeller wheel 47 and the turbine wheel 50 forms a hydrodynamic circuit 60.

The manner of functioning of the clutch device is as follows. A rotating movement about the axis of rotation 2 occurring at the crankshaft 3 is transmitted to the planetary gears 11. Due to the tooth engagement 16 with the ring gear 17, planetary gears 11 are connected with ring gear 17, wherein the ring gear 17 is supported at the additional drive 19. As previously explained briefly, by presetting a speed at the additional drive 19, a relative speed can be built up with respect to the planetary gears 15 by which the speed of the sun gear 29 is adjusted. When the planetary gearset is so constructed such that it causes a speed increase, as in the present case, the impeller torque in the clutch housing 39 can be increased. The same possibility exists when a brake 20 is used instead of the additional drive 19, wherein this brake 20 could also be formed by a generator. The speed of the ring gear 17 can be influenced by the braking strength, and the efficiency of the clutch device can be predetermined in this manner. If the brake 20 is formed by a generator, it can even transform the braking energy into electrical energy and feed it to the battery of the motor vehicle for storage. In this manner, the efficiency is particularly high.

Another advantageous possibility offered by the planetary gearset 5 consists in that the brake 20 or the additional drive 19 is disengaged from the ring gear 17 such that there is no longer any torque support of the ring gear 17. In this switching slate of the additional drive 19 or brake 20, there is virtually no longer any torque at the sun gear 29 when the planetary gears 11 are driven. Since there is no driving of the impeller wheel 47 via the clutch housing 39, there is also no hydrodynamic driving of the turbine wheel 50, and therefore no driving of the driven shaft which is in a rotational connection therewith. Thus, the vehicle can idle without losses being generated in the hydrodynamic circuit 60.

Since a constructional embodiment of the planetary gearset 5 and of the torque converter is shown in FIG. 1 and the additional Figures only show other switching variants of the subject matter of the invention, schematic drawings of the switching variants are indicated for the sake of a better understanding of the differences.

Figure 2:
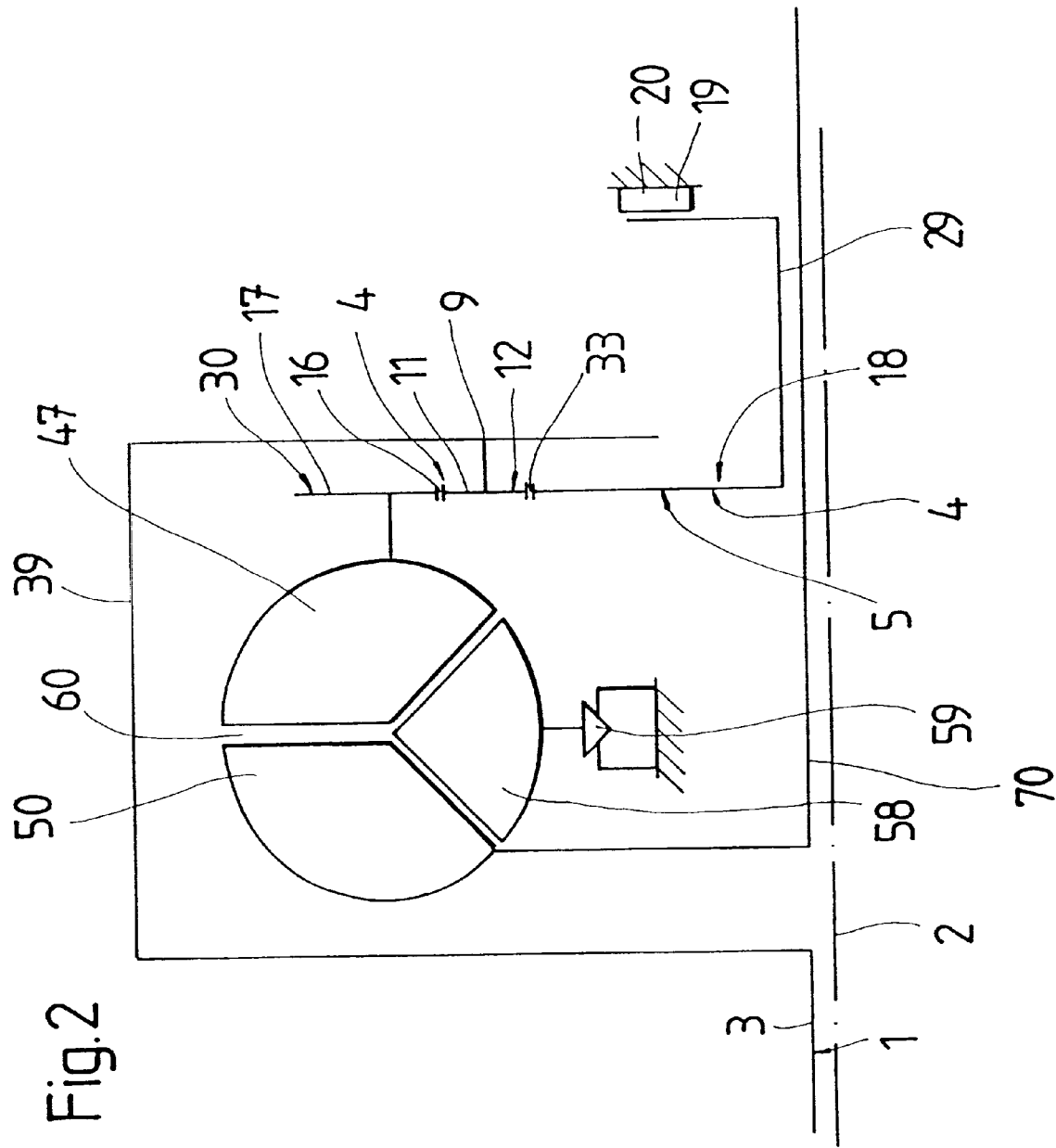
FIG. 2 is a schematic view of the clutch device according to FIG. 1, with the planetary gearset arranged between the clutch housing and the impeller wheel and with a brake for a sun gear of the planetary gearset.

FIG. 2 shows an embodiment in which the clutch housing 39 is fastened to the crankshaft 3 (drive 1) and serves as a planetary carrier 9 for the planetary gears 11. The planetary gears 11 are connected, via the tooth engagement 16, with the ring gear 17 which is connected with the impeller wheel 47 so as to be fixed with respect to rotation relative to it. Further, the planetary gears 11 are connected, via the tooth engagement 33, with the sun gear 29 which is in a working connection with an additional drive 19 or with a brake 20 which can be, but need not be, arranged outside of the clutch housing 39. Thus, in the present embodiment, the planetary gearset 5 is operatively arranged between the clutch housing 39 and the impeller wheel 47, which has the advantage that the clutch housing 39 need not be designed for the higher operating pressures occurring at higher speeds. Only the impeller wheel 47 must be constructed in a correspondingly stable manner.

The movement of the crankshaft 3 is transferred in a 1:1 ratio to the clutch housing 39 which drives the planetary gears 11 during movements about the axis of rotation 2. These planetary gears 11 accordingly act as drive-side transmission elements 12. The speed of the sun gear 29 is adjusted depending on the speed preset at the additional drive 19 or on the braking strength of the brake 20, wherein the sun gear 29 accordingly acts as an intermediate transmission element 18 and, because of the difference in speed between it and the planetary gears 11, predetermines the rate of rotation of the ring gear 17 which acts as a driven-side transmission element 30.

The additional drive 19 can be operated in a different manner which is particularly important with respect to a hybrid drive. When drive 1 is switched off and the crankshaft 3 and clutch housing 39 are consequently stationary, the ring gear 17, and accordingly the impeller wheel 47, are driven via the planetary gears 11 when the additional drive 19 is running. The turbine wheel 50 and therefore the driven shaft are carried along via the hydrodynamic circuit 60, so that the vehicle is driven exclusively via the additional drive 19. When the additional drive 19 is constructed as an electric motor, an electric drive is accordingly realized in addition to the internal combustion engine. The possibility, already mentioned above, of feeding back electrical energy to the motor vehicle battery when the electric motor is operated as a generator and also as a brake is correspondingly relevant. It is also possible to operate the additional drive 19 such that it supports the crankshaft 3 in its driving effort. It is merely necessary to adjust the appropriate speed at the additional drive 19. If the movement of the crankshaft is prevented, it is possible to drive the drivetrain with the electric motor.

All of the possible applications described with reference to FIG. 1 can also be realized in the switching variant of the planetary gearset 5 according to FIG. 2.

Figure 3:
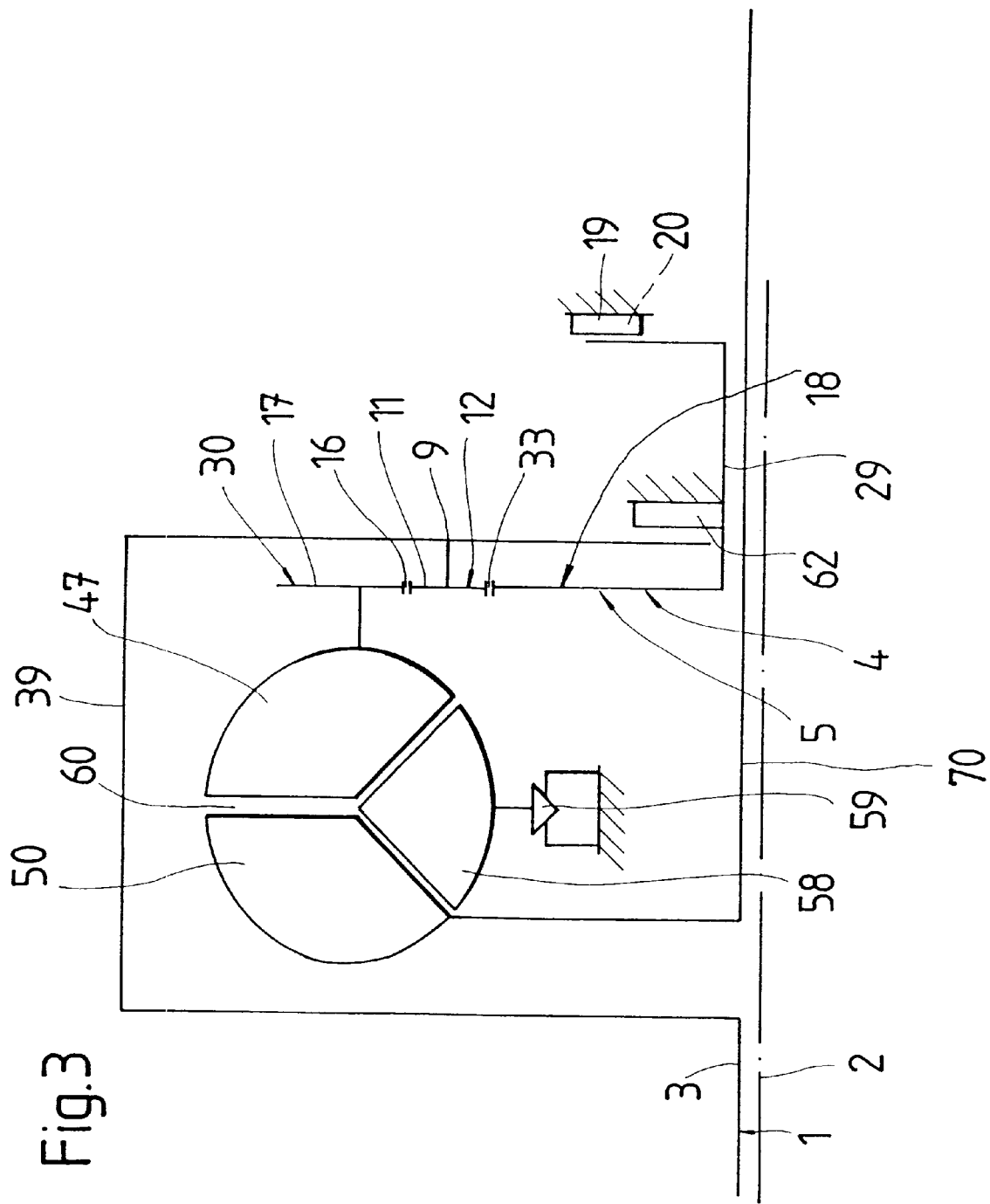
FIG. 3 is a schematic view corresponding to FIG. 2, showing an additional brake between the clutch housing and sun gear according to an embodiment of the invention.

The switching embodiment according to FIG. 3 differs from that shown in FIG. 2 in that the clutch housing 39 is connected with the sun gear 29 via an additional brake 62. The reason for this is, if the additional drive 19 and the brake 20 for the sun gear 29 and the additional brake 62 are disengaged, the impeller wheel 47 is driven at minimum speed while the crankshaft 3 rotates, so that there is only a small transmission drag torque present between the impeller wheel 47 and the turbine wheel 50. If the additional drive 19 and the brake 20 remain disengaged from the sun gear 29, while the additional brake 62 connects the sun gear 29 with the transmission housing 39, the impeller wheel 47 rotates at a speed which substantially corresponds to that of the crankshaft 3. This corresponds to a first switching step. On the other hand, if the additional drive 19 is in a working connection with the sun gear 29 or the brake 20 is closed and the additional brake 62 is open, the impeller wheel 47 rotates at the multiplied speed achieved by the planetary gearset 5. This corresponds to a second switching step. If the additional drive 19 or the brake 20 and the additional brake 62 are in a working connection with the sun gear 29, the drive 1, and accordingly the entire drivetrain, can be braked.

The additional brake 62 shown in FIG. 3 is omitted from FIG. 4 and, instead, a freewheel 64 is arranged between the clutch housing 39 and the sun gear 29. The above-described controlling of the additional brake, as concerns its efficiency or inefficiency, is accordingly not necessary. The freewheel 64 is supposed to lock when the speed of the sun gear 29 is greater than that of the clutch housing 39. This is the case when the additional drive 19 or the brake 20 is no longer in a working connection with the sun gear 29. The location of the freewheel 64 is of secondary importance in this respect. Of essential importance is only that the differential movement of the transmission elements relative to one another is prevented because otherwise the first of two possible switching steps could not be realized.

As is schematically shown in FIG. 5, the planetary gearset 5 according to the invention can, of course, be constructed with a lockup clutch as will be seen, for example, from DE 44 23 640 A1 which was cited previously. In the present case, the lockup clutch., referred to hereinafter as clutch 66 for the sake of brevity, can be brought into a working connection with the ring gear 17. In this way, the impeller wheel 47 can be synchronously driven with the turbine wheel 50 by means of the ring gear 17. Flow losses between the two wheels 47 and 50 are accordingly prevented.

While a speed increase was always achieved at the impeller wheel 47 by means of the planetary gearset 5 in the switching variations described above, the planetary gearset 5 according to FIG. 6 acts such that it causes a speed reduction. With respect to the construction design, the sun gear 29 is received together with the converter housing 39 so as to be fixed with respect to the drive 1 relative to rotation. The sun gear 29 engages, via the tooth engagement 33, the planetary gears 11 which are fastened to the turbine wheel 50. The planetary gears 11 are in a working connection with the ring gear 17 via the tooth engagement 16 which is connected with the clutch housing 39 via the freewheel 64. Further, the ring gear 17 can be brought into a working connection with the additional drive 19 or the brake 20. The sun gear 29 accordingly acts as a drive-side transmission element 12 and the ring gear 17 acts as an intermediate transmission element 18 and the planetary gears 11 act as driven-side transmission element 30. As soon as the speed of the ring gear 17 is reduced via the additional drive 19 or the brake 20, the impeller wheel 47 is driven at reduced speed in relation to the speed of the drive 1. On the other hand, after the ring gear 17 is released by the additional drive 19 or the brake 20, the movement of the drive 1 is transferred to the impeller wheel 47 in a ratio of 1:1.

Proceeding from the switching variation according to FIG. 5, FIG. 7 shows a construction in which the clutch 66 is connected with the turbine wheel 50 via a torsional vibration damper 68. Since torsional vibration dampers are known, per se, in hydrodynamic clutch devices, for example, from DE 41 21 586 A1, FIG. 1, its design construction is not discussed more fully. In contrast, FIG. 8 shows the torsional vibration damper 68 between the turbine wheel 50 and a driven shaft 70 formed, for example, by the input shaft of an automatic transmission connected with the clutch device. Of course, this arrangement of the torsional vibration damper is not limited to the construction of the hydrodynamic clutch device with clutch 66, but rather can also be realized in other constructions.

The invention is not limited by the embodiments described above which are presented as examples only but can be modified in various ways within the scope of protection defined by the appended patent claims.

I claim:

1. A hydrodynamic clutch device comprising:
    a clutch housing in working connection with at least one drive;
    a hydrodynamic circuit comprising at least an impeller wheel and a turbine wheel, wherein a speed of the impeller wheel is adjusted corresponding to a speed of said clutch housing;
    a transmission unit connecting said at least one drive to the impeller wheel for effecting a change in the speed, said transmission unit comprising a drive side transmission element operably connected with said a least one drive and a driven-side transmission element fastened to the clutch housing;
    a planetary gearset formed in part by said drive side transmission element and said driven-side transmission element;
    at least one intermediate transmission element operably associated with said drive-side transmission element and said driven-side transmission element;
    an additional drive operably connected with said at least one intermediate transmission element; and
    a brake operably connected with said intermediate transmission element.

2. The hydrodynamic clutch in accordance with claim 1, further comprising a planetary carrier formed by said drive for receiving said planetary gearset.

3. The hydrodynamic clutch in accordance with claim 1, further comprising a planetary carrier formed by the clutch housing when said drive is connected with said clutch housing so as to be fixed with respect to rotation relative to it.

4. The hydrodynamic clutch in accordance with claim 1, further comprising an additional brake for connecting said intermediate transmission element with the clutch housing.

5. The hydrodynamic clutch in accordance with claim 1, further comprising a freewheel for connecting said intermediate transmission element with the clutch housing.

6. A hydrodynamic clutch comprising:
    a clutch housing in working connection with at least one drive;
    a hydrodynamic circuit comprising at least an impeller wheel and a turbine wheel, wherein a speed of the impeller wheel is adjusted corresponding to a speed of said clutch housing;
    a transmission unit connecting said at least one drive to the impeller wheel for effecting a change in the speed, said transmission unit comprising a drive-side transmission element operably connected with said clutch housing and a driven-side transmission element operably connected with the impeller wheel;
    a clutch for connecting said driven-side element with the turbine wheel; and
    a torsional vibration damper connecting said clutch with the turbine wheel.

7. A hydrodynamic clutch comprising:
    a clutch housing in working connection with at least one drive;
    a hydrodynamic circuit comprising at least an impeller wheel and a turbine wheel, wherein a speed of the impeller wheel is adjusted corresponding to a speed of said clutch housing;
    a transmission unit connecting said at least one drive to the impeller wheel for effecting a chance in the speed, said transmission unit comprising a drive-side transmission element operably connected with said clutch housing and a driven-side transmission element operably connected with the impeller wheel;
    a clutch for connecting said driven-side element with the turbine wheel; and
    a torsional vibration damper connecting the turbine wheel with another driven shaft.

* * * * *